(12) United States Patent
Badino et al.

(10) Patent No.: US 12,036,834 B2
(45) Date of Patent: Jul. 16, 2024

(54) INTEGRATED STEERING SUSPENSION MODULE FOR A VEHICLE

(71) Applicants: AKTIEBOLAGET SKF, Gothenburg (SE); FCA ITALY S.p.A., Turin (IT)

(72) Inventors: Renato Badino, Turin (IT); Marco Falossi, San Raffaele Cimena (IT); Francesco Lamboglia, Pinerolo (IT); Carlo Pavesio, Turin (IT)

(73) Assignees: AKTIEBOLAGET SKF, Gothenburg (SE); FCA ITALY S.p.A., Turin (IT)

( * ) Notice: Subject to any disclaimer, the term of this patent is extended or adjusted under 35 U.S.C. 154(b) by 0 days.

(21) Appl. No.: 17/677,762

(22) Filed: Feb. 22, 2022

(65) Prior Publication Data
US 2022/0266645 A1 Aug. 25, 2022

(30) Foreign Application Priority Data
Feb. 23, 2021 (IT) ........................ 102021000004076

(51) Int. Cl.
*B60G 13/00* (2006.01)
*B60G 7/00* (2006.01)
(Continued)

(52) U.S. Cl.
CPC .......... *B60G 13/006* (2013.01); *B60G 7/005* (2013.01); *B62D 7/16* (2013.01); *B62D 7/20* (2013.01);
(Continued)

(58) Field of Classification Search
CPC .. B60G 13/006; B60G 7/005; B60G 2200/10; B60G 2204/129; B60G 2204/416;
(Continued)

(56) References Cited

U.S. PATENT DOCUMENTS

| 3,749,415 A | 7/1973 | Sampatacos |
| 3,865,394 A * | 2/1975 | Epner ...................... B62D 7/18 280/93.512 |

(Continued)

FOREIGN PATENT DOCUMENTS

| CN | 111332363 A * | 6/2020 | ............... B62D 7/18 |
| DE | 102005043909 A1 | 3/2006 | |

(Continued)

OTHER PUBLICATIONS

Beganovic, Pivot Bearing, Dec. 31, 2015, EPO, DE 102014212514 A1, Machine Translation of Description (Year: 2015).*

(Continued)

*Primary Examiner* — Amy R Weisberg
*Assistant Examiner* — Matthew D Lee
(74) *Attorney, Agent, or Firm* — Harness, Dickey & Pierce, P.L.C.

(57) ABSTRACT

Steering suspension module including a shock absorber strut, a suspension upright, an outer ring of a wheel hub unit attached integrally to a front face of the suspension upright, and a ball joint for articulation with a control arm; wherein the suspension strut consists of a cup-shaped body made entirely of continuous, sheared and bent metal sheet, and the outer ring is provided integral in one piece with, and radially cantilevered from, a steering arm extending transversely cantilevered from the cup-shaped body, on the side of the cup-shaped body; the shock absorber strut is constrained within a first seat of the cup-shaped body and the ball joint is made as an independent unit constrained integrally with a second seat of the cup-shaped body in a position facing the first seat, the ball joint projecting inferiorly cantilevered from the cup-shaped body.

12 Claims, 5 Drawing Sheets

(51) Int. Cl.
*B62D 7/16* (2006.01)
*B62D 7/20* (2006.01)
*F16D 55/00* (2006.01)
*F16D 65/00* (2006.01)

(52) U.S. Cl.
CPC .... *B60G 2200/10* (2013.01); *B60G 2204/129* (2013.01); *B60G 2204/416* (2013.01); *B60G 2204/418* (2013.01); *F16D 2055/0012* (2013.01); *F16D 65/0062* (2013.01)

(58) Field of Classification Search
CPC .......... B60G 2204/418; B60G 2206/50; B60G 2206/722; B60G 13/005; B60G 2200/44; B60G 2204/10; B62D 7/20; B62D 7/16; B62D 7/18; F16D 65/0062; F16D 2055/0012
See application file for complete search history.

(56) References Cited

U.S. PATENT DOCUMENTS

| | | | |
|---|---|---|---|
| 4,274,654 A | 6/1981 | Travaglio | |
| 4,491,340 A * | 1/1985 | Von Grunberg | B60T 1/065 301/124.1 |
| 4,545,600 A * | 10/1985 | Muller | B60G 3/14 280/124.15 |
| 4,582,338 A | 4/1986 | Colanzi | |
| 4,722,540 A * | 2/1988 | Kozyra | B62D 7/18 280/124.136 |
| 4,761,019 A * | 8/1988 | Dubensky | B60G 7/001 403/114 |
| 5,120,150 A * | 6/1992 | Kozyra | B60G 7/008 403/297 |
| 5,927,820 A | 7/1999 | Vignotto et al. | |
| D612,304 S * | 3/2010 | Mahnig | B62D 7/18 D12/160 |
| 8,469,378 B1 * | 6/2013 | Bodary | B62D 7/18 280/93.512 |
| 2003/0107259 A1 | 6/2003 | Rutter | |
| 2005/0007128 A1 | 1/2005 | Beckous et al. | |
| 2005/0077128 A1 | 4/2005 | Vissers et al. | |
| 2006/0054423 A1 | 3/2006 | Murata | |
| 2008/0296860 A1 * | 12/2008 | Webster | B62D 7/18 280/93.512 |
| 2009/0010581 A1 | 1/2009 | Takahashi | |
| 2014/0306412 A1 * | 10/2014 | van der Jagt | B62D 7/18 280/93.508 |
| 2020/0047796 A1 * | 2/2020 | Falossi | B60G 3/01 |
| 2022/0266645 A1 * | 8/2022 | Badino | B60G 13/006 |

FOREIGN PATENT DOCUMENTS

| | | | | |
|---|---|---|---|---|
| DE | 102011007831 A1 | 10/2012 | | |
| DE | 102013209987 B3 | 11/2014 | | |
| DE | 102014211632 A1 * | 12/2015 | ......... | B60B 27/0047 |
| DE | 102014212514 A1 * | 12/2015 | ............... | B62D 7/18 |
| DE | 102015212112 A1 | 1/2017 | | |
| EP | 0680836 A1 | 11/1995 | | |
| IT | 1129136 B * | 6/1986 | ............... | B62D 7/18 |
| IT | 1160984 B * | 3/1987 | ........... | B60G 13/006 |
| JP | 2005132255 A * | 5/2005 | ........... | F02M 31/125 |
| JP | 2017213959 A * | 12/2017 | | |

OTHER PUBLICATIONS

Search Report issued in corresponding Italian Patent Application No. 102021000004076 dated Nov. 9, 2021.

\* cited by examiner

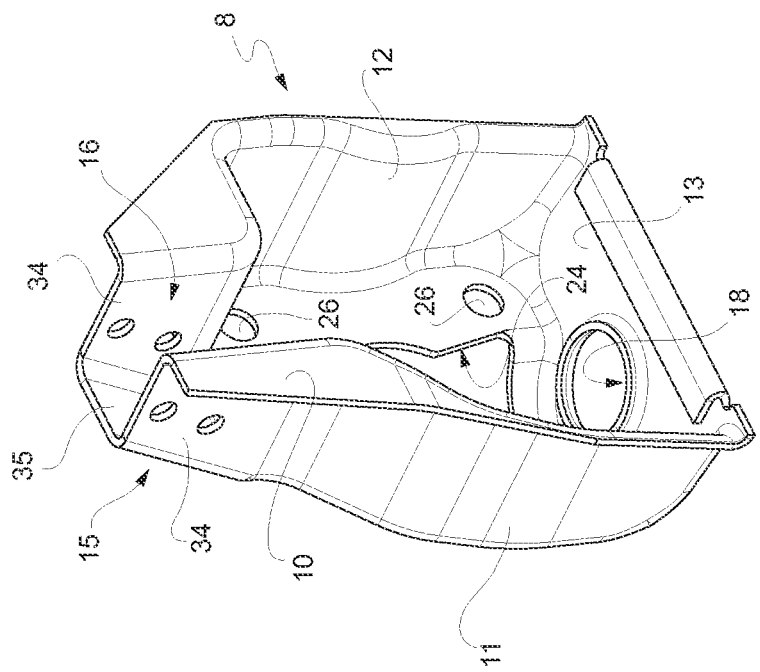
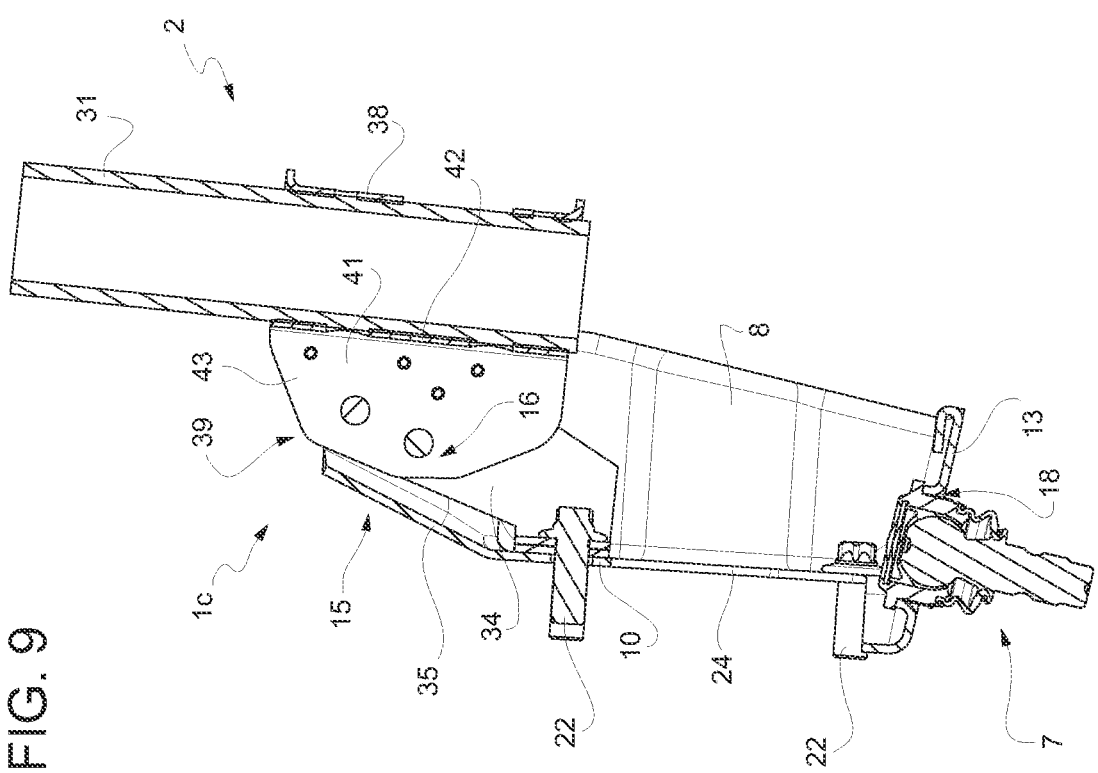

INTEGRATED STEERING SUSPENSION MODULE FOR A VEHICLE

CROSS-REFERENCE TO RELATED APPLICATIONS

This Patent Application claims priority from Italian Patent Application No. 102021000004076 filed on Feb. 23, 2021, the entire disclosure of which is incorporated herein by reference.

TECHNICAL SECTOR OF THE INVENTION

The present invention relates to an integrated steering suspension module for a vehicle. In particular, the present invention applies preferably, but not exclusively, to independent wheel suspension systems with a McPherson architecture.

PRIOR ART

It is known that independent wheel suspension systems with a McPherson architecture include, for each vehicle wheel, a suspension module consisting of a wheel hub unit and a suspension upright. The suspension upright, which is usually cast or forged from a metal alloy, such as cast iron or light alloy, is provided, at the top, integral in a one piece with a support for a shock absorber body, a ball joint for the lower control arm at the bottom and, in the case of a steering suspension, a steering arm which protrudes laterally cantilevered from the upright and is integral with it. A wheel hub unit is connected to such a suspension upright by means of connecting elements, such as screws, nails, rivets or the like, for example as disclosed in US2009010581.

In order to lighten these suspension modules, both in view of weight reductions to reduce fuel consumption, and also in view of the increasingly frequent adoption of this type of suspension module on electrically driven vehicles, it has been proposed to use a support for the shock absorber body made from a stamped sheet metal, to which the wheel hub unit is attached on one front face thereof and an annular body provided with the steering arm and possibly also with the lower joint on an opposite rear face thereof. This solution is disclosed for example in US20050077128A1.

Although it may be possible to reduce the overall weight and cost of a suspension upright making it entirely of metal sheet, it appears to be difficult, or at least complex and expensive, since it has to integrate technical elements such as the lower joint and the support for the shock absorber body, not to mention the steering arm, for which a high degree of local rigidity, which can hardly be provided by a metal sheet construction, is required.

In particular, such a solution would have the following drawbacks:
- manufacturing processes such as bending or deep drawing do not offer the required accuracy for kinematically positioning the fixing points for the other suspension module components;
- bending and deep-drawing operations do not allow complex articulated shapes to be achieved including all the necessary kinematic constraint points;
- the connection points of the brake caliper and the steering arm require a very high local stiffness, which can hardly be achieved through thin metal sheet walls.

Finally, almost all the existing solutions cannot be equally used on both the left and the right side of the vehicle (i.e. the driver's side and passenger's side) without being modified, and therefore require the use of different components, specific to each side of the vehicle, resulting in higher costs and production complexity.

SUMMARY OF THE INVENTION

The aim of the present invention is therefore to provide an integrated steering suspension module for a vehicle which is an alternative to those of the state of the art and in particular capable of obtaining significant weight reduction and constructive simplification, while ensuring high reliability. It is a further aim of the invention to provide such an integrated suspension module that is configurable with an architecture which makes it suitable to be equally used for both the driver and passenger side wheels, i.e. which is configurable for an L/R (left/right) installation.

According to the invention, there is therefore provided an integrated steering suspension module for a vehicle as defined in the appended Claims.

BRIEF DESCRIPTION OF THE DRAWINGS

Further characteristics and advantages of the present invention will become clear from the following description of non-limiting embodiments thereof, made with reference to the figures of the attached drawings, in which:

FIG. 9 schematically shows an elevation and sectional view according to a section plane IX-IX of the suspension module of FIG. 7; and FIG. 10 schematically shows a three-quarter view from behind of a component of the suspension module of FIG. 7.

DETAILED DESCRIPTION

Figure 2:
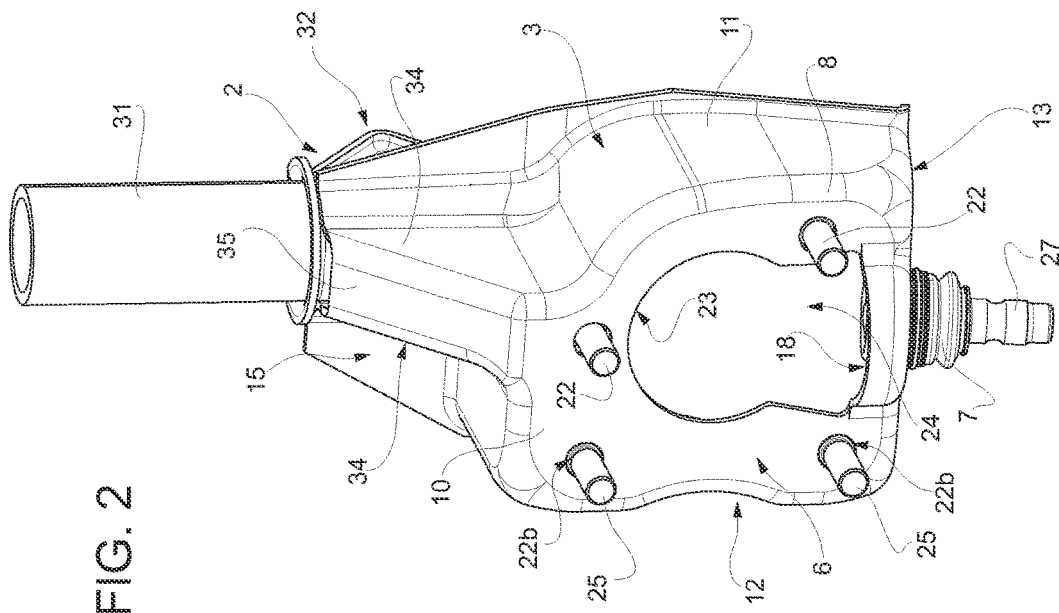
FIG. 2 schematically shows the same view as in FIG. 1 of the same suspension module as in FIG. 1 with parts removed for better understanding.
Figure 1:
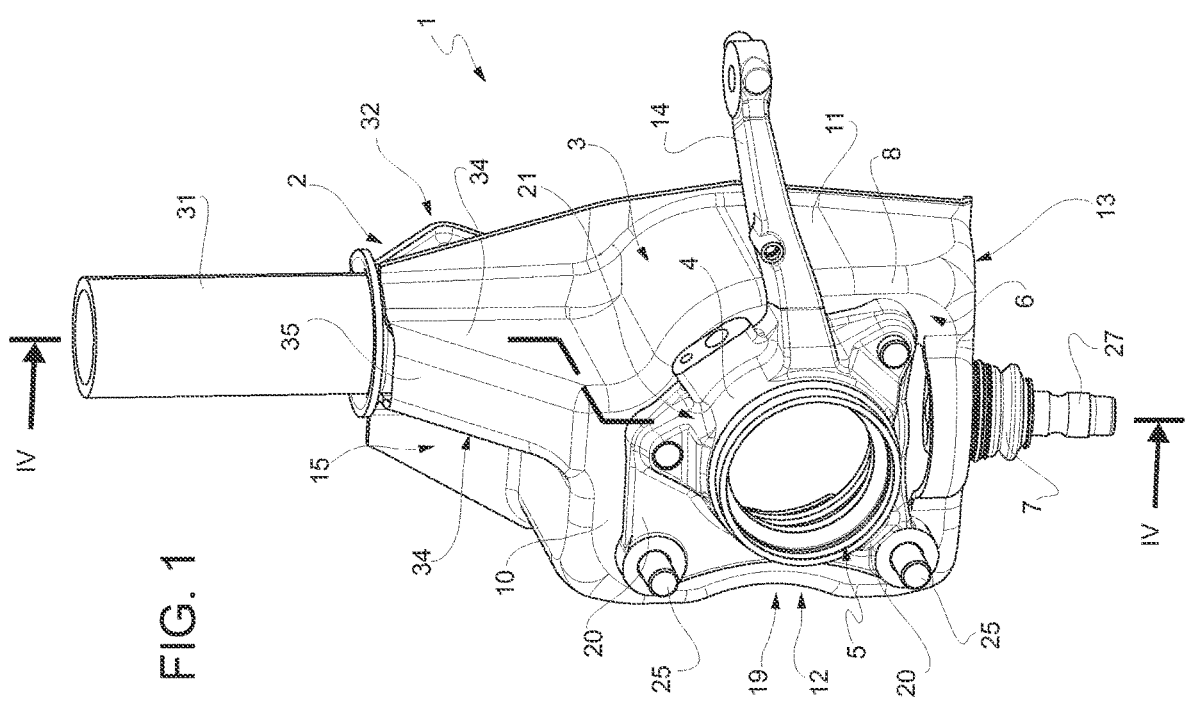
FIG. 1 schematically shows a three-quarter view from above of an integrated steering suspension module for a vehicle according to the invention.
Figure 4:
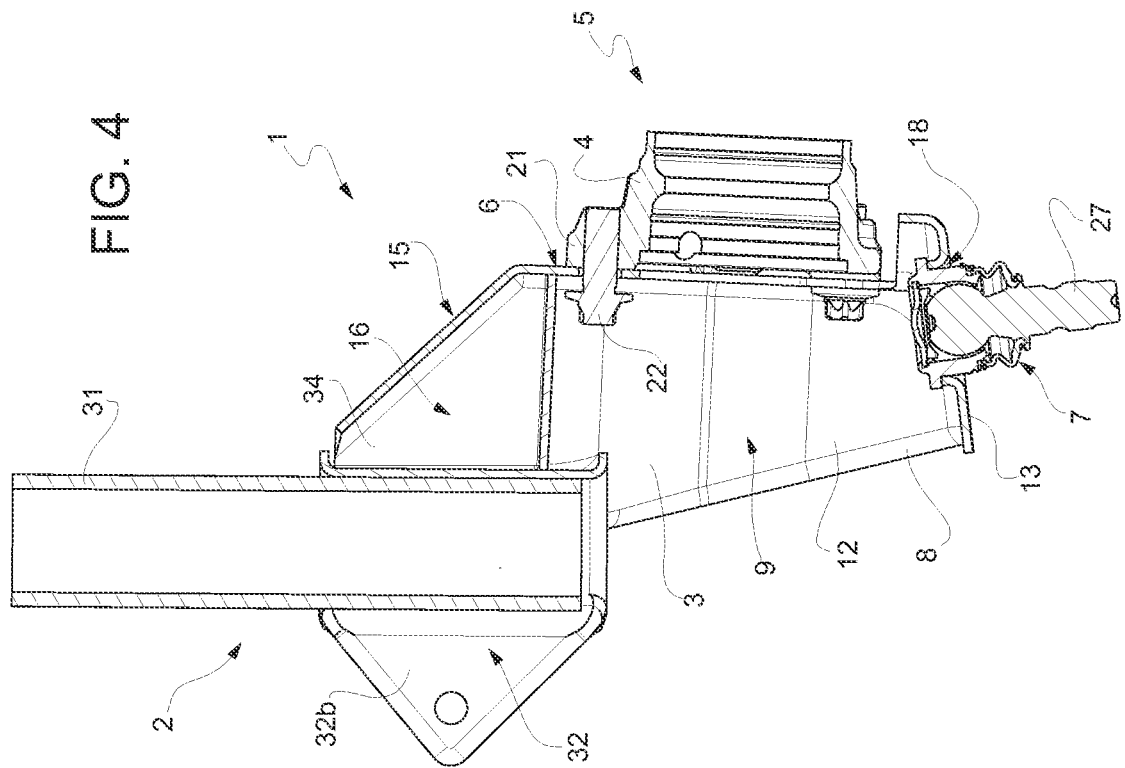
FIG. 4 schematically shows an elevation and sectional view according to a section plane IV-IV of the suspension module in FIG. 1.
Figure 3:
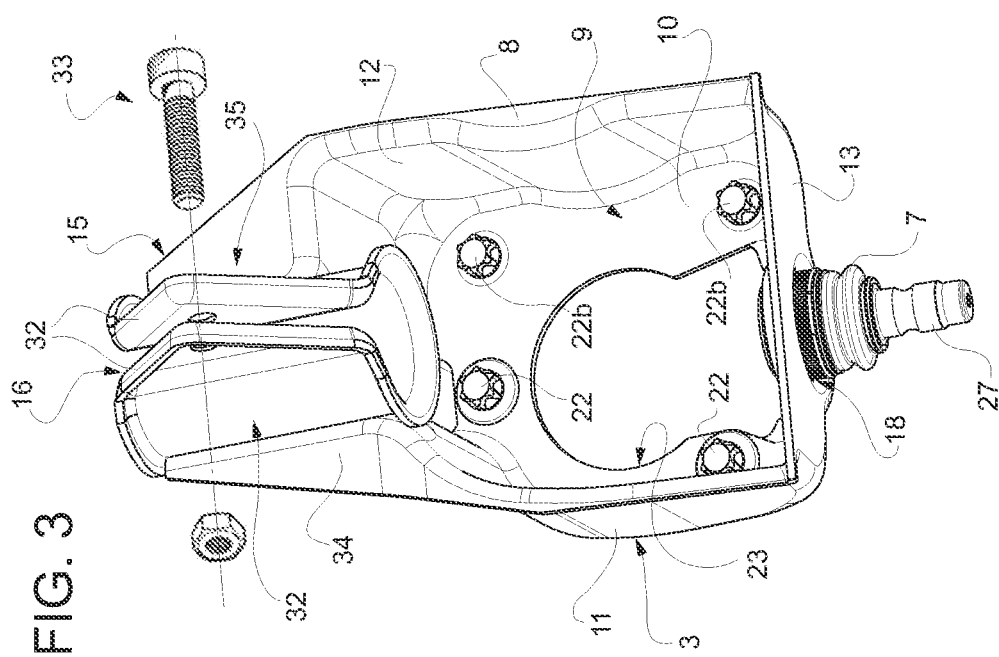
FIG. 3 schematically shows a three-quarter perspective view from behind of the suspension module of FIG. 1 with parts removed for better understanding.

With reference to FIGS. 1 to 4, an integrated steering suspension module for a vehicle suspension system, known and not shown for ease of simplicity, is overall denoted by 1.

In particular, the embodiment 1, not limitedly shown, of the suspension module according to the invention is of the McPherson architecture type, but it is clear that what will be said is applicable to any other type of suitable suspension architecture.

The integrated suspension module 1 comprises a shock absorber strut 2, a suspension upright 3 bearing the shock absorber strut 2 at the top, and an outer ring 4 of a wheel hub unit 5 or a rolling bearing forming part of the wheel hub unit 5.

The wheel hub unit 5 is shown for ease of simplicity only with parts removed, the removed parts being known in themselves.

The outer ring 4 is fixed integral to a front face 6 of the suspension upright 3. The front face 6 is configured to be facing the outside of the vehicle, in use, thus towards the wheel mounted (in a manner known and not shown for ease of simplicity) on the wheel hub unit 5 on a side opposite to the suspension upright 3.

The steering suspension module 1 further comprises a ball joint 7 configured for articulation with a lower control arm, known and not shown for ease of simplicity, of the aforesaid suspension system, also known and not shown.

According to a first aspect of the invention, the suspension upright 3 consists of a cup-shaped body 8 delimiting a concavity 9 therein (FIGS. 3 and 4) and entirely made of a continuous metal sheet (made of steel or other suitable alloys), which has been sheared and bent from a sheet in coils, for example by a deep drawing operation, so that the cup-shaped body 8 has substantially a same wall thickness everywhere.

In particular, the cup-shaped body 8 comprises a bottom wall 10, substantially flat and defining/delimiting, on the side opposite to the concavity 9, the front face 6, a first side wall 11 and a second side wall 12 opposite and facing the side wall 11.

The side walls 11 and 12 are arranged at the sides of the shock absorber strut 2 and are integrally connected in one piece and continuously to the bottom wall 10.

The cup-shaped body 8 also comprises a third side wall 13 arranged transversely to the first and second side walls 11 and 12 and also integrally connected in one piece with them and with the end wall 10, but on the side opposite to the shock absorber strut 2, which it is facing.

According to a further aspect of the invention, the outer ring 4 is provided integral in one piece with, and radially cantilevered from, a steering arm 14 of any known type and extending transversely cantilevered from the cup-shaped body 8, on the side of the first side wall 11 and beside the cup-shaped body 8.

Thereby, the steering arm 14 does not discharge in use the mechanical stresses it receives directly on the suspension upright 3, but conversely discharges them directly on the outer ring 4, which is made by forging or casting with a suitable material thickness.

The outer ring 3, then, will transmit only a part of these stresses to the face 6 of the suspension upright 3, therefore over a relatively large area, with a consequent reduction of local stresses by load distribution.

The shock absorber strut 2 is constrained integral to a top or upper end 15 of the cup-shaped body 8, opposite to the third side wall 13.

In particular, the shock absorber strut 2 is constrained, as will be seen, within a first seat 16 of the cup-shaped body 8; the seat 16 is at least partially made within the concavity 9 of the cup-shaped body 8 and constitutes a first interface of the cup-shaped body 8, obtained integral in one piece therewith.

According to another aspect of the invention, the ball joint 7 is made as an independent, self-supporting unit, which is constrained integral with the third side wall 13, at a second seat 18 of the cup-shaped body 8.

The seat 18 is machined in the third side wall 13 in a position facing the first seat 16 and in such a way that the ball joint 7 protrudes inferiorly cantilevered from the cup-shaped body 8, on a side opposite to the shock absorber strut 2. The seat 18 constitutes a second interface of the cup-shaped body 8, made integral in one piece with it.

The integrated steering suspension module 1 according to the invention further comprises a support 19 (FIG. 1) for a brake caliper, known and not shown for ease of simplicity.

The brake caliper support 19 includes, according to a non-secondary aspect of the invention, a pair of lugs or studs 20 (FIG. 1) integrally machined in one piece with the outer ring 4 and extending radially cantilevered from the outer ring 4, on a side opposite to the steering arm 14, so that the brake caliper support 19 is integral with the cup-shaped body 8 at least (or only) through the outer ring 4.

In particular, the outer ring 4 is attached to, and integral with, the cup-shaped body 8, against the face 6 and thus directly with the bottom wall 10, by means of an annular flange 21 (FIGS. 1 and 4) radially external to the outer ring 4 and through at least one plurality of connecting organs 22, preferably of a removable type such as screws or bolts.

The connecting organs 22 are housed in the concavity 9 of the cup-shaped body 8 and pass through the bottom wall 10 of the cup-shaped body to engage the flange 21 on the side opposite to the face 6.

According to other possible embodiments, such connecting organs 22 may also be of a non-removable type, such as nails or rivets. Furthermore, according to possible embodiments not shown, the outer ring 4 may be attached to the bottom wall 10 not only by means of the connecting organs 22, but also by plastic deformation.

In fact, the bottom wall 10 is provided with a through opening or window 24 which is for housing the wheel hub unit 5 and/or allowing the passage of the power transmission to the latter.

Therefore, part of a peripheral edge 23 of the through opening or window 24 centrally drilled through the bottom wall 10 may be folded or pressed on the flange 21. Alternatively, it is also possible to make a collar integral in one piece on the outer ring, on the vehicle inner side, which can then be plastically deformed on the metal sheet of the cup-shaped body 8 to make the connection.

In any case, according to one aspect of the invention, a first pair of connecting organs 22b housed in the concavity 9 of the cup-shaped body 8 crosses the bottom wall 10 thereof to engage not only the flange 21 but also, simultaneously, the lugs or studs 20 to secure directly both the flange 21 and the lugs or studs 20 in contact against the front face 6 delimited by the bottom wall 10 of the cup-shaped body 8.

Such first pair of connecting organs 22b terminates (FIGS. 1 and 2) with respective fastening/mounting pins 25 for the brake caliper, which project cantilevered from the lugs or studs 20, on the side opposite to the cup-shaped body 8, and perpendicular to the front face 6.

Thereby, the mechanical stresses transmitted in use by the brake calliper are also received not directly by the suspension upright 3, but by the outer ring 4 which then, by means of the flange 21, distributes them over the large surface defined by the face 6 and from this in a distributed manner (therefore with lower local stresses) to the walls 10, 11, 12 and 13 of the cup-shaped body 8.

In the embodiment of FIGS. 1-4 just described, where the lugs or studs 20 are also attached integrally to the bottom wall 10 in a direct manner by means of the connecting organs 22b, such stress distribution is even greater than that which would in any case be ensured by the flange 21, so the cup-shaped body 8 is stressed even less.

Figure 5:
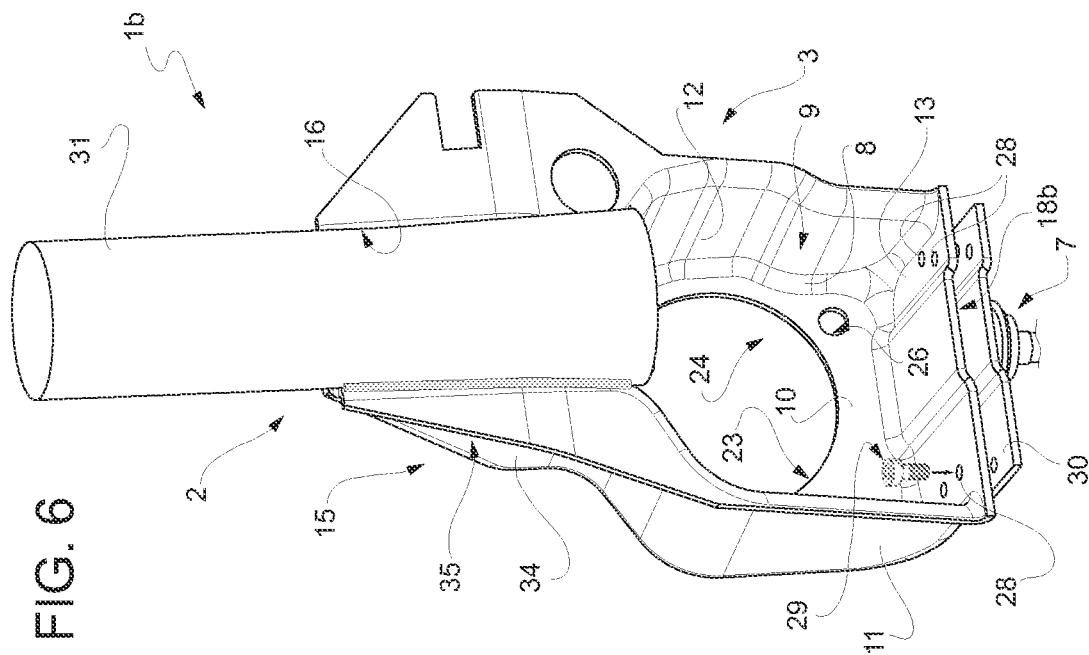
FIGS. 5 and 6 show respective three-quarter perspective views from above and from behind of a second embodiment of the suspension module according to the invention, with parts removed for better understanding.
Figure 6:
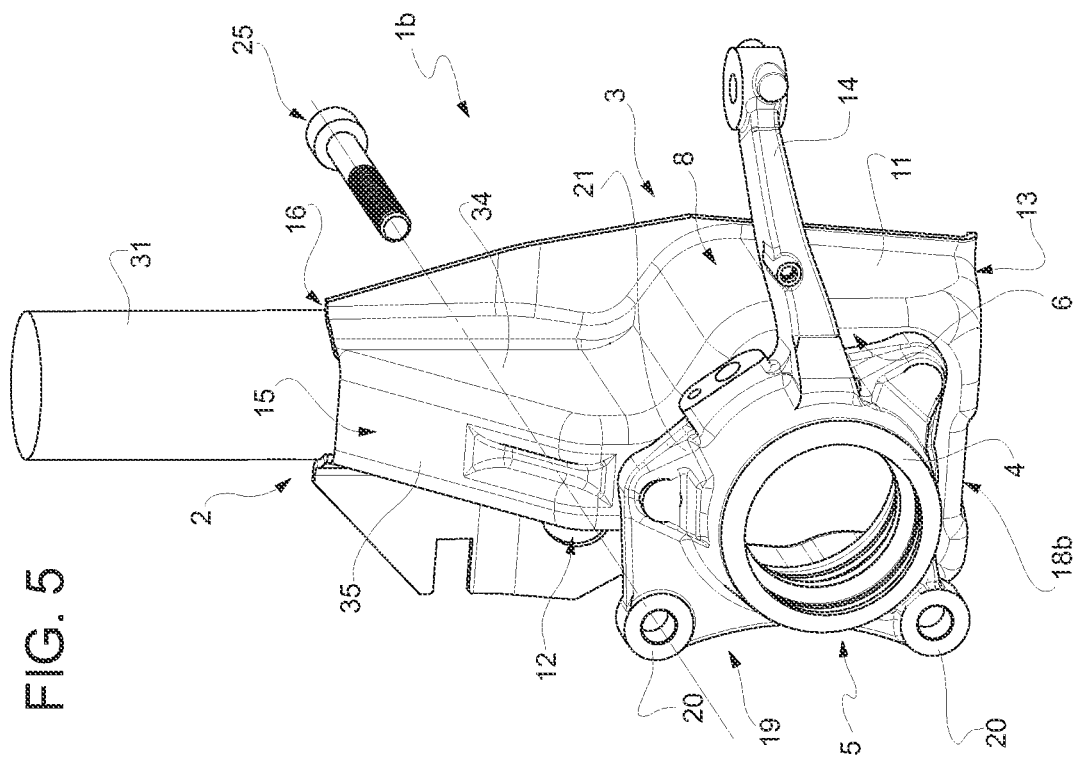
Figure 8:
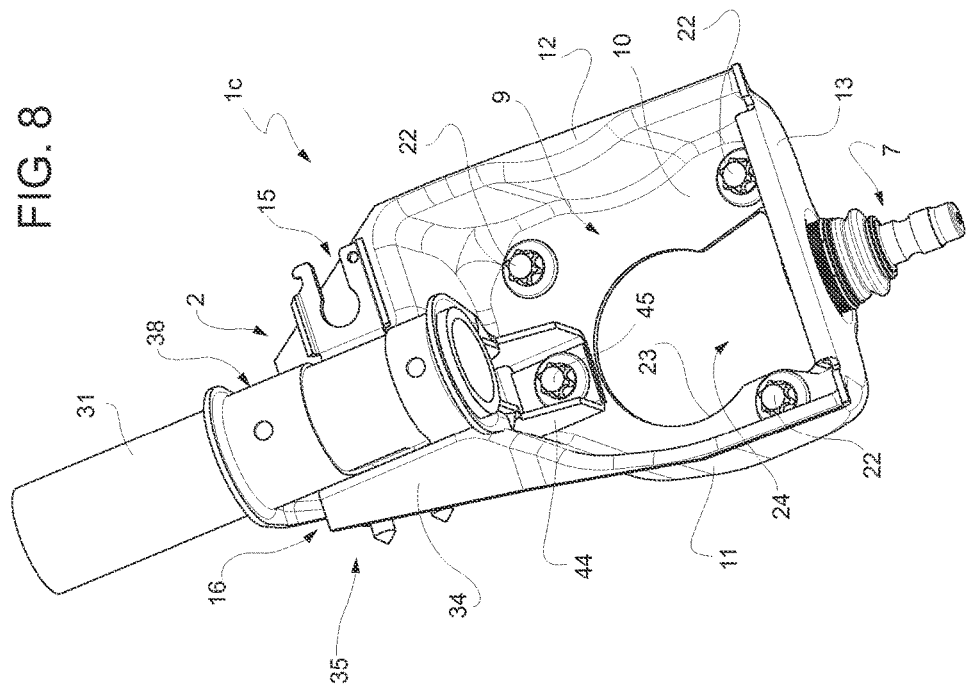
FIGS. 7 and 8 show respective three-quarter perspective views from the front and from behind of a third embodiment of the suspension module according to the invention, with parts removed for better understanding.
Figure 7:
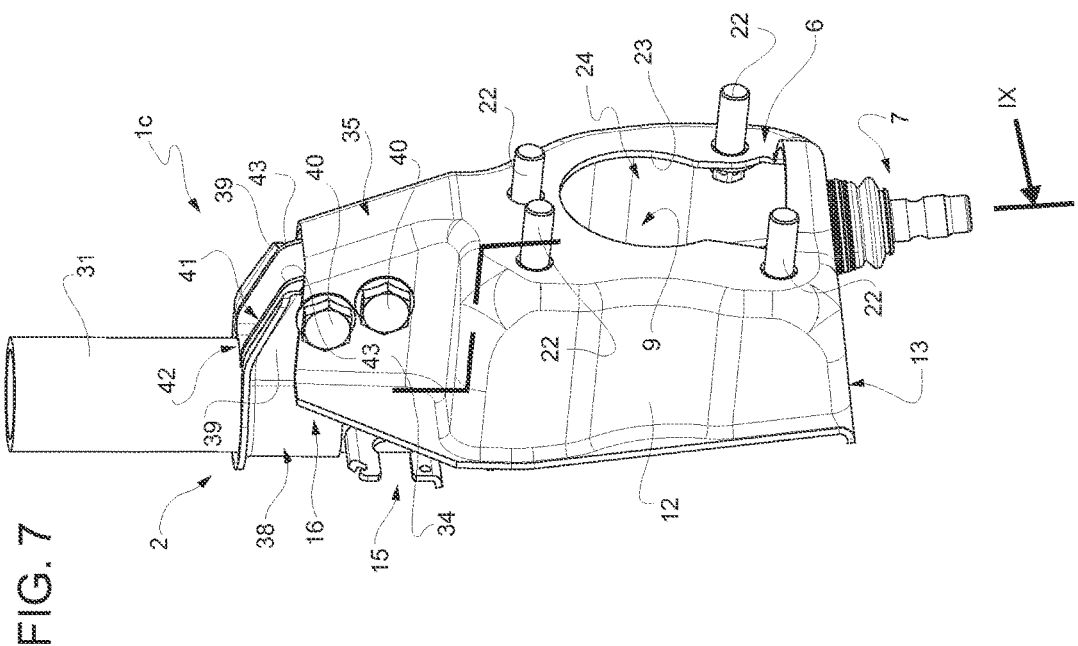

With reference to FIGS. 5 and 6, a different embodiment 1*b* of the integrated steering suspension module of the invention is shown therein. Details similar or identical to those already described are denoted by the same numbers.

In this embodiment, the outer ring 4 is attached integral to the cup-shaped body 8 by means of only the radially outer annular flange 21 and by means of at least a plurality of connecting organs, such as organs 22 and not shown for ease of simplicity, such as screws or bolts, which are housed passing through the bottom wall 10, on the side of the concavity 9, by means of respective through holes 26 of the bottom wall 10 (obviously also present in the module 1) drilled around the through opening 24 and only one of which is visible in FIG. 6.

In this case, the lugs or studs 20 protrude cantilevered relative to front face 6, on the side of the second side wall 12 and on the side opposite to the steering arm 14, also because the shape of the cup-shaped body 8 of this variant 1*b* is different from that of the body 8 of the suspension module 1. While the latter has an asymmetrical shape with respect to the shock absorber strut 2, in that it extends on the side of the side wall 12 so as to "cover" the transversal bulk of the lugs or studs 20, in the case of the suspension module 1*b* the cup-shaped body 8 has a substantially symmetrical shape with respect to the shock absorber strut 2, i.e. it extends on both sides of the shock absorber strut 2 by substantially a same amount. Also in this variant 1*b*, the lugs or studs 20 are configured to receive integral respective pins 25 (only one of which is shown for ease of simplicity) for fastening a brake caliper, pins 25 projecting perpendicularly cantilevered from the lugs or studs 20, on the side opposite to the cup-shaped body 8, as in the case of module 1.

In this variant 1*b*, the stresses transmitted by the brake calliper are discharged directly only on the outer ring 4, since the lugs or studs 20 are not in contact with the face 6.

In any case, according to all the embodiments of the suspension module according to the invention, as will be seen, the bottom wall 10 of the cup-shaped body 8 is substantially flat and is always provided with the through opening 24 around which a plurality of non-threaded through holes 26 are arranged that are configured to receive on the concavity side 9 of the cup-shaped body 8 a plurality of connecting organs 22/22*b*, such as bolts or screws or other, which pass through the bottom wall 10 to couple with respective fastening elements (the flange 21 and, if applicable, the lugs or studs 20) of the outer ring 4 to attach the latter integrally to the cup-shaped body 8, at the through opening 24.

According to the first embodiment described, in module 1 the mentioned second seat or interface comprises a through hole 18 drilled through the third side wall 13 of the cup-shaped body 8 and in which hole 18 the ball joint 7, made as an independent unit, is fitted through by interference fit, so as to (FIGS. 3 and 4) project cantilevered from the side wall 18 both inwardly of the cup-shaped body 8, within the concavity 9, and outwardly of the cup-shaped body 8, with one end thereof 27 configured to mate with the mentioned lower control arm of the known and not shown suspension system.

According to the embodiment 1*b*, on the other hand (FIGS. 5 and 6), the second seat or interface comprises a coining 18*b* (in the example shown) or through opening (similar to the hole 18 of the module 1) obtained in the third side wall 13 and configured to receive the ball joint 7 made as an independent unit so that the latter protrudes cantilevered from the side wall 13, on a side opposite to the concavity 9 of the cup-shaped body 8. In both cases, the third side wall 13 is further provided with a plurality of through holes 28 drilled around the coining 18*b* or around the through opening 18 and configured to receive a plurality of connecting organs 29, such as screws or bolts (only one of which is shown for ease of simplicity), to secure the ball joint 7 integrally to the third side wall 13.

For example, in case the coining 18*b* is present, the ball joint 7 may be carried by a shaped plate 30 which is coupled to the coining 18*b* by form fitting and then secured by screws 29. According to a further possible embodiment, not shown for ease of simplicity, the ball joint 7 may integrally have a flanged element which may be coupled to the wall 13 by means of screws or rivets, in which case the second interface is defined by the wall 13 itself with the respective passage holes for the screws or rivets.

Referring now to FIGS. 7 to 10, a further embodiment 1*c* of the integrated steering suspension module of the invention is shown therein.

Details similar or equal to those already described are denoted for ease of simplicity by the same numbers.

The variant 1*c*, which is shown for ease of simplicity with parts removed, such as the outer ring 4 provided with the steering arm 14, is similar to the suspension module 1 already described, except for how the shock absorber strut 2 is constrained. The variant 1*b* already described differs from the described suspension module 1 not only in the way the ball joint 7 is constrained, but also in the way the shock absorber strut 2 is constrained.

Referring to FIGS. 1-4, in the steering suspension module 1, the shock absorber strut 2 comprises a metal tubular member 31 and a semi-annular metal sleeve 32 shaped to be elastically deformable in a circumferential direction.

The semi-annular sleeve 32 is shod radially on the outside of the tubular member 31 and is tightened on the tubular member 31 by at least one locking member 33, such as a screw or bolt, engaging respective through-holes of a pair of winglets 32*b* that protrude transversely cantilevered from the rest of the sleeve 32.

The semi-annular sleeve 32 is integrally welded to a pair of respective opposite flanks 34 of a U-shaped portion 35 of the cup-shaped body 8 constituting its top 15 and provided integrally in one piece with the bottom wall 10 and the first and second side walls 11 and 12.

The semi-annular sleeve 32 and the U-shaped portion 35 of the cup-shaped body 8 constitute the aforementioned first seat, or first interface, 16.

With reference to FIGS. 5 and 6, in the steering suspension module 1*b*, the first seat 16 consists of a U-shaped portion 35 of the cup-shaped body 8 constituting the top 15 thereof and obtained integral in one piece with the bottom wall 10 and with the first and second side walls 11 and 12.

The shock absorber strut 2 comprises a first metal tubular element 31 as in embodiment 1, attached in any convenient manner within the U-shaped portion 35.

With reference to FIGS. 7 to 10, in the steering suspension module 1*c*, the first seat or first interface 16 again consists of a U-shaped portion 35 of the cup-shaped body 8 constituting its top 15 and obtained integrally in one piece with the bottom wall 10 and the first and second side walls 11 and 12.

In this case, the shock absorber strut 2 comprises a first metal tubular element 31, which is shod and locked integrally (for example by pressing) within a basket-shaped receiving tubular element 38, circumferentially open towards the cup-shaped body 8 in correspondence of two opposite first winglets 39 which protrude transversely cantilevered outwardly therefrom and which are integrally coupled, by means of connecting elements 40 (FIG. 7), for example screws or bolts, within the U-shaped portion 35 of the cup-shaped body 8.

Between the first winglets 39 a U-shaped bracket 41 is inserted having a transversal base 42 (FIGS. 7 and 9) which clamps the tubular element 31 against a side wall of the receiving element 38 and two second winglets 43 which cooperate in contact with the first winglets 39 and which are crossed through by the connecting elements 40.

The receiving element 38 preferably also comprises (FIG. 8) a foot 44 extending within the concavity 9 of the cup-shaped body 8 and is clamped against the bottom wall 10, integral with it, by means of a further connecting member 45, for example a screw or bolt, mounted passing through the foot 44 and a through hole of the bottom wall 10.

Thanks to what described, it is clear that the integrated steering suspension module according to the invention allows to adopt metal sheet material with reduced wall thickness (3÷4 mm) to make a simplified suspension upright (including also the ball joint 7). This is because it does not provide the steering arm and brake caliper interfaces for which high manufacturing accuracy and local rigidity are required. The simplified upright has only three main interfaces that can be mounted or removed according to the user (vehicle manufacturer) requirements. It is in fact inserted into the overall architecture of a known suspension system, e.g.

McPherson architecture, by means of the following interfaces:

- shock absorber/upright interface; the shock absorber tube can be connected to the metal sheet upright by fixing, welding or clamping;
- ball joint/upright interface: the suspension upright of metal sheet has a dedicated housing wherein the head of the ball joint is press-fitted; alternatively, the ball joint may also be assembled by bolting or nailing.
- outer ring/upright interface: the metal sheet upright is assembled with the outer ring and, if necessary, with the brake calliper by means of non-threaded mounting holes. The upright of metal sheet and the outer steering ring may be assembled by bolting, riveting or plastic deformation.

The simplified upright of metal sheet has a simple shape, which can be easily machined through a standard drawing/moulding operation. Interfaces for which a high local stiffness is required (brake caliper and steering arm) are assigned to the outer ring 4.

The overall stiffness of the upright is ensured by the presence of walls of metal sheet, such as side walls 11 and 12, which lie in the plane of the tilting moment. In addition, some specific ribs can be added to the flange 21 on the steering outer ring to increase the stiffness of the whole assembly.

Reducing the overall weight is finally obtained by reducing the amount of screws or bolts to be used.

For example, in order to connect the brake caliper and wheel hub unit (HBU) 5 to the upright 3 of metal sheet, a third generation HBU (bi-flanged) is used in the case of a state-of-the-art configuration and there will be two screws for mounting the brake caliper and a minimum of three screws for mounting the outer ring, for a total of five screws. According to the invention, however, there will be two screws for mounting the brake caliper together with the outer ring provided with a steering arm (FIGS. 1-4) and only two screws for mounting the steering outer ring. These two screws can possibly be replaced by rivets or by plastic deformation, e.g. of the edge 23, for a total of two to four screws only, saving weight and costs if compared to the configuration of the prior art.

In addition, by decoupling the part of the joint functions and in particular the upper and lower connections, depending on the surrounding components, it is generally possible to obtain a single left/right design.

In the case of the outer ring 4, a single design of the only forging component (with a difference in L/R machining) or even a completely symmetrical design (forging and machining) can be achieved, saving significantly on equipment. Even the simplified upright or joint of metal sheet can always be designed as a single L/R design.

Ultimately, the integrated suspension module according to the invention meets the need for a lightweight solution for a McPherson front suspension, and the weight reduction is the factor enabling for greater autonomy of electric vehicles and lower fuel consumption in the case of standard combustion engines.

It also meets the vehicle manufacturer's need to keep component costs as low as possible. To date, the known solutions are not symmetrical for left/right suspensions, so two codes are needed to equip an entire axle. Conversely, the integrated suspension module according to the invention can be designed in such a way that it is symmetrical for L/R (left/right) applications, which allows for a reduced equipment cost and thus a lower component cost.

Other advantages are:

Overall weight saving;

Potential cost savings (optimisation of tooling costs) due to symmetry between left/right components.

Increased local stiffness for steering arm and brake calliper connection by removing separate interfaces.

All the aims of the invention are therefore achieved.

The invention claimed is:

1. An integrated steering suspension module for a vehicle suspension system comprising:
   a shock absorber strut;
   a suspension upright bearing superiorly the shock absorber strut;
   an outer ring of a wheel hub unit or of a rolling bearing forming part of the wheel hub unit, the outer ring being attached integrally to a front face of the suspension upright;
   wherein:
   the suspension upright consists of a cup-shaped body delimiting on the inside thereof a concavity and entirely made of a continuous metal sheet, which has been sheared and bent, the cup-shaped body comprising: a bottom wall defining, on the side opposite to the concavity of the cup-shaped body, said front face of the suspension upright; a first and a second side wall arranged at the sides of the shock-absorber strut and integrally connected in one piece and continuously to the bottom wall and a third side wall arranged transversally to the first and second side walls and integrally connected in one piece with the first and second side walls and with the bottom wall, on the side opposite to the shock-absorber strut, to which the third side wall is facing;
   said outer ring is provided integral in one piece and radially cantilevered by a steering arm extending transversely cantilevered from the cup-shaped body, on the side of the first side wall and sideways to the cup-shaped body;
   the shock-absorber strut is constrained integral to a top of the cup-shaped body, opposite to the third side wall, within a first interface of the cup-shaped body, which is defined by a first seat of the cup-shaped body made at least partially within the concavity of the cup-shaped body;

the first seat comprising a U-shaped portion of the cup-shaped body constituting the top thereof and obtained integral in one piece with the bottom wall and with the first and second side walls; the shock-absorber strut comprising a first metal tubular element, which is clamped and locked solidly within a receiving tubular element circumferentially open towards the cup-shaped body in correspondence of two opposite first winglets of the receiving element, which winglets protrude transversely to the receiving elements and are rigidly coupled, by means of connecting elements, like screws or bolts, to and within the U-shaped portion of the cup-shaped body; between said first winglets being inserted a U-shaped bracket having a transversal base which clamps the tubular element against a side wall of the receiving element and two second winglets which cooperate in contact with the first winglets and are crossed through by the connecting elements.

2. The integrated steering suspension module according to claim 1, characterized in that the cup-shaped body is provided with a second interface, which is defined by a second seat of the cup-shaped body obtained in the third side wall, in a position facing to the first seat; the second seat being configured to receive in use a ball joint, which in turn is configured for articulation with a lower control arm of the suspension system, the ball joint coming to be an integral part of the integrated steering suspension module; the ball joint being made as an independent unit, which is constrained integral with the third side wall, at the second seat, so that the ball joint protrudes inferiorly cantilevered from the cup-shaped body, on the side opposite to the shock absorber strut.

3. The integrated steering suspension module according to claim 2, characterized in that said second seat comprises a through hole drilled through the third side wall of the cup-shaped body and in which the ball joint made as an independent unit is fitted through by interference fit, the ball joint projecting cantilevered from the third side wall both inwardly of the cup-shaped body, within said concavity, and, with one end thereof, outwardly of the cup-shaped body, said one end being configured to mate with the lower control arm.

4. The integrated steering suspension module according to claim 2, characterized in that said second seat comprises a coining (18b) or at least one through opening obtained in the third side wall and configured to receive the ball joint realized as an independent unit, the ball joint protruding cantilevered from the third side wall, on the side opposite to the concavity of the cup-shaped body; said third side wall being further provided with a plurality of through holes around said coining or through opening configured to receive a plurality of connecting members, including screws or bolts, to secure the ball joint rigidly to the third side wall.

5. The integrated steering suspension module according to claim 1, further comprising a brake caliper support comprising in turn a pair of lugs or studs machined integral in one piece with the outer ring and extending radially cantilevered from the outer ring, on the side opposite to the steering arm, the brake caliper support resulting to be integral with the cup-shaped body at least via the outer ring.

6. The integrated steering suspension module according to claim 5, characterized in that the outer ring is fixed to the cup-shaped body integral therewith by means of an annular flange arranged radially on the outside of the outer ring and by means of at least one plurality of connecting organs, including screws or bolts; a first pair (22b) of said connecting organs being housed in the concavity of the cup-shaped body and crossing the bottom wall thereof to engage said flange and, simultaneously, also said lugs or studs to secure the flange and the lugs or studs against the front face delimited by the bottom wall of the cup-shaped body; said first pair (22b) of connecting organs terminating with respective fastening pins for a brake caliper projecting cantilevered from the lugs or studs, on the side opposite to the cup-shaped body, perpendicularly to said front face.

7. The integrated steering suspension module according to claim 5, characterized in that the outer ring is attached to, and integral with, the cup-shaped body by means of an annular flange radially external to the outer ring and by means of at least one plurality of connecting organs, including screws or bolts; said lugs or studs projecting in cantilevered fashion with respect to the front face of the upright, on the side of the second side wall and on the side opposite to the steering arm; the lugs or studs being configured to receive integrally respective pins for securing a brake caliper, the pins projecting perpendicularly cantilevered from the lugs or studs, on a side opposite to the cup-shaped body.

8. The integrated steering suspension module according to claim 1, characterized in that the bottom wall of the cup-shaped body is substantially flat and is provided with a through opening around which are arranged a plurality of unthreaded through holes configured to receive from the concavity side of the cup-shaped body a plurality of connecting organs, including bolts or screws, which pass through the bottom wall to couple with respective fastening elements of the outer ring to secure the outer ring rigidly to the cup-shaped body, at the through opening thereof.

9. The integrated steering suspension module according to claim 1, characterized in that the shock absorber strut comprises a metal tubular member and a semi-annular metal sleeve shaped to be elastically deformable in a circumferential direction, the semi-annular sleeve being shod radially on the outside of the tubular member and being tightened on the tubular member by a locking member; the semi-annular sleeve being integrally welded to a pair of respective opposite flanks of a U-shaped portion of the cup-shaped body constituting the top thereof and provided integrally in one piece with the bottom wall and the first and second side walls; the semi-annular sleeve and the U-shaped portion of the cup-shaped body constituting said first seat.

10. The integrated steering suspension module according to claim 1, characterized in that the first seat comprises a U-shaped portion of the cup-shaped body constituting the top thereof and obtained integral in one piece with the bottom wall and with the first and second side walls; the shock-absorber strut comprising a first metal tubular element clamped within the U-shaped portion, integral thereto.

11. The integrated steering suspension module according to claim 1, wherein the receiving element includes a foot extending within the concavity of the cup-shaped body and clamped against the bottom wall, integral therewith, by means of a connecting member, like a screw or bolt, mounted passing through the foot and a hole in the back wall.

12. An integrated steering suspension module for a vehicle suspension system, comprising:
a shock absorber strut;
a suspension upright bearing superiorly the shock absorber strut;

an outer ring of a wheel hub unit or of a rolling bearing forming part of the wheel hub unit, the outer ring being attached integrally to a front face of the suspension upright;

wherein:

the suspension upright consists of a cup-shaped body delimiting on the inside thereof a concavity and entirely made of a continuous metal sheet, which has been sheared and bent, the cup-shaped body comprising: a bottom wall defining, on the side opposite to the concavity of the cup-shaped body, said front face of the suspension upright; a first and a second side wall arranged at the sides of the shock-absorber strut and integrally connected in one piece and continuously to the bottom wall; and a third side wall arranged transversally to the first and second side walls and integrally connected in one piece with the first and second side walls latter and with the bottom wall, on the side opposite to the shock-absorber strut, to which the third side wall it is facing;

said outer ring is provided integral in one piece and radially cantilevered by a steering arm extending transversely cantilevered from the cup-shaped body, on the side of the first side wall and sideways to the cup-shaped body;

the shock-absorber strut is constrained integral to a top of the cup-shaped body, opposite to the third side wall, within a first interface of the cup-shaped body, which is defined by a first seat of the cup-shaped body made at least partially within the concavity of the cup-shaped body; and the integrated steering suspension module further comprises a brake caliper support comprising in turn a pair of lugs or studs machined integral in one piece with the outer ring and extending radially cantilevered from the outer ring, on the side opposite to the steering arm, the brake caliper support resulting to be integral with the cup-shaped body at least via the outer ring; the outer ring being fixed to the cup-shaped body, integrally therewith, by means of an annular flange arranged radially on the outside of the outer ring and by means of at least one plurality of connecting organs including screws or bolts; a first pair of said connecting organs being housed in the concavity of the cup-shaped body and crossing the bottom wall thereof to engage said flange and, simultaneously, also said lugs or studs to secure the flange and the lugs or studs against the front face delimited by the bottom wall of the cup-shaped body; said first pair of connecting organs terminating with respective fastening pins for a brake caliper, projecting cantilevered from the lugs or studs, on the side opposite to the cup-shaped body, perpendicularly to said front face.

* * * * *